United States Patent [19]

Miller

[11] Patent Number: 4,906,522

[45] Date of Patent: Mar. 6, 1990

[54] COMPOUNDS OF NICKEL, IRON AND PHOSPHORUS

[75] Inventor: George T. Miller, Lewiston, N.Y.

[73] Assignee: Occidental Chemical Corporation, Niagara Falls, N.Y.

[21] Appl. No.: 42,195

[22] Filed: Apr. 24, 1987

[51] Int. Cl.$^4$ .................. B32B 27/20; C22B 4/06; C22C 38/08

[52] U.S. Cl. .................. 428/323; 75/10.63; 75/10.66; 106/456; 106/480; 252/513; 420/94; 420/119; 428/457; 428/704

[58] Field of Search ............... 420/94, 119; 75/10.63, 75/10.66, 113; 252/513; 62.55; 106/456, 480; 428/323

[56] References Cited

U.S. PATENT DOCUMENTS

| | | | |
|---|---|---|---|
| 2,757,083 | 7/1956 | Story | 75/133 |
| 3,562,124 | 2/1971 | Leon | 428/328 |
| 4,407,901 | 10/1983 | Miyatsura et al. | 428/900 |
| 4,447,492 | 5/1984 | McKaveney | 428/328 |
| 4,517,118 | 5/1985 | Stoetzer | 524/440 |
| 4,643,765 | 2/1987 | Takajo | 75/0.5B |
| 4,653,500 | 3/1987 | Osada et al. | 128/639 |
| 4,690,863 | 9/1987 | Miyoshi et al. | 428/328 |
| 4,728,462 | 3/1988 | Miller et al. | 252/519 |
| 4,735,864 | 4/1988 | Masumoto et al. | 428/606 |
| 4,748,080 | 5/1988 | Itozawa | 428/329 |
| 4,774,270 | 9/1988 | Sullivan et al. | 252/519 |

*Primary Examiner*—George F. Lesmes
*Assistant Examiner*—Elizabeth M. Cole
*Attorney, Agent, or Firm*—James F. Tao; Richard D. Fuerle

[57] ABSTRACT

Compositions of nickel, iron and phosphorus, are prepared by fusing nickel and ferrophosphorus in an inert atmosphere, with the nickel preferably comprising from about 5% to about 70% by weight of the composition. The fused composition is ground or atomized to form a conductive, corrosion resistant pigment, preferably having a particle size of from about 0.1 to about 15 microns. This pigment can then be incorporated into a suitable resin binder, optionally with one or more other suitable metals such as zinc or nickel, to prepare corrosion resistant coatings, weldable coatings, EMI shielding coatings, electrostatic dissipation coatings, or electrically conductive coatings.

18 Claims, No Drawings

COMPOUNDS OF NICKEL, IRON AND PHOSPHORUS

BACKGROUND OF THE INVENTION

The present invention relates to a particulate composition of nickel, iron and phosphorus which is formed by fusing nickel and ferrophosphorus in an inert atmosphere. The resulting particles are highly conductive and have excellent corrosion resistance.

Coatings which are designed to provide cathodic corrosion protection for metal structures such as pipes, storage tanks, bridges, and the like, as well as metal surfaces used in marine applications, such as ship hulls, support structures for drilling rigs, docks, and the like, are well known in the art. The active component of such coatings generally forms an internal battery with the metal surface to be protected and thus acts as a sacrificial anode. These coatings contain metal particles which are more anodic than the metal surface to be protected. The metal particles are present as a pigment in a suitable binder. Coating compositions utilize many organic or inorganic binder materials and a conductive metal such as particles of zinc.

In order to provide effective corrosion protection to the metal surface, appreciable amounts of zinc, i.e. 80% or more by weight of the total solids composition, are frequently used in the coating. Since zinc is a relatively expensive metal for this purpose, such large amounts of zinc add greatly to the cost of providing such protection.

Previous attempts to provide lower cost substitutes for zinc-rich coatings have focused on substituting other suitable metal pigment materials for at least a portion of the zinc in the coatings. The use of ferrophosphorus powder as a replacement for up to 50% or more of the zinc in these coatings is well established. See U.S. Pat. No. 3,562,124, issued Feb. 9, 1971. The resulting coating composition is not only less expensive than conventional zinc-rich coatings, but also, in some instances, possesses enhanced corrosion protection. Ferrophosphorus particles which are used in such applications are available commercially from the Occidental Chemical Corporation under the trademark Ferrophos$^R$ pigment.

The use of Ferrophos pigment in electromagnetic interference shielding (EMI) applications is also disclosed in the prior art. See U.S. Pat. No. 4,447,492, issued May 8, 1984, and U.S. Pat. No. 4,517,118, issued May 14, 1985. These patents disclose the use of Ferrophos pigment alone or in combination with other conductive materials, such as nickel powder, in coating compositions which can be used to coat plastic substrates for electromagnetic interference shielding purposes. In this application, the coating serves to protect the substrate from electromagnetic energy emanating from other sources, or to prevent the escape of electromagnetic energy from within a housing formed from the plastic material. In order to be effective in this application, a pigment desirably has a high conductivity, as well as superior magnetic properties, and should b escapable of providing attenuations of about 30 decibles or more over a frequency range of 0.5 to 1,000 MHz.

Good electrical conductivity is essential for EMI shielding applications, and this will depend on good interparticle contact. An electrical current should flow from particle-to-particle with the lowest amount of contact resistance. Interparticle resistivity can increase, however, due to the formation of an oxide or other passivating film on the surface of the particle. Although relatively this in terms of the dimensions of the particle, e.g. perhaps only a few atoms thick, these passivation layers impart a high resistivity to the surface of the particle and thus reduce the flow of current between contiguous particles. Attempts to clean the surface of the particles using, for instance, a dilute mineral acid solution are only temporarily successful since the passivation layer will readily reform on the particle surface. For this reason, most non-noble metals, such as copper and iron, are readily passivated and therefore fail in such applications. The failure rate is accelerated under conditions of elevated temperature and high humidity.

Pigment grade nickel has good conductivity and magnetic properties and is resistant to passivation. However, nickel of this quality is relatively expensive even for many highly specialized applications.

Commonly assigned copending application Serial No. 848,012, filed Apr. 3, 1986, now U.S. Pat. No. 4,728,462 describes the surface treatment of ferrophosphorus particles using an aqueous solution of potassium dichromate and zinc sulfate. The surface treatment forms a thin, passivating layer which significantly improves the conductivity of the particles without substantially increasing the cost of the pigment. The improvements achieved using this treatment process are limited by the inherent conductive and magnetic properties of ferrophosphorus. Since ferrophosphorus is essentially non-magnetic, its effectiveness as an electromagnetic (EMI) shielding material is considerably circumscribed.

It will be readily appreciated that a continuing need exists for relatively inexpensive conductive pigments having improved characteristics such as electrical and magnetic properties, as well as improved resistance to passivation.

SUMMARY OF THE INVENTION

In accordance with the present invention, a nickel, iron and phosphorus composition is prepared by fusing nickel and ferrophosphorus in an inert atmosphere. The nickel is preferably present in an amount of from about 5% to about 70% by total weight of the composition. When the amount of nickel present is between about 20% and about 60%, an alloy designated by the formula $Fe_{(3-x)}Ni_xP$ is formed, in which X is between 1 and 2.

The nickel, iron and phosphorus composition is formed into a pigment comprising particles typically in the range of from about 0.1 to about 15 microns. These particles are highly conductive and have excellent corrosion resistance, and are useful in a variety of applications, either along or in combination with other metals such as zinc and nickel. These applications include pigments for corrosion resistant paints, weldable coatings, EMI shielding paints and electrically conductive coatings. In these applications, the particles are formulated in a suitable binder for application to an appropriate substrate.

DESCRIPTION OF THE PREFERRED EMBODIMENTS

The compositions of the present invention contain the elements nickel, iron and phosphorus, with the iron and phosphorus constituents being supplied as ferrophosphorus, an iron phosphide composition generally containing from about 20% to 28% by weight of phosphorus, and corresponding chemically to a mixture of $Fe_2P$ and $FeP$. The principle impurities occurring in commercial ferrophosphorus compositions are silicon, titanium, calcium and manganese, as well as trace amounts of other elements. Of these, silicon and manganese are the major impurities, typically being present in amounts of up to 7% by weight. Ferrophosphorus is obtained as a by-product in the commercial manufacture of elemental phosphorus by the electric furnace reduction of phosphate ores, the iron present in the phosphate ores forming the iron phosphide material. Ferrophosphorus is electrically conductive, brittle, and substantially unreactive in water, dilute acidic or alkaline environments.

The ferrophosphorus is fused with nickel to form a molten mass. Since nickel melts at about 1455° C., while ferrophosphorus melts at about 1,320° C., the minimum temperature required for fusion is 1455° C. A convenient method for fusing the nickel and ferrophosphorus is to add nickel to molten ferrophosphorus during the electric furnace reduction of phosphate ores, when ferrophosphorus is already in a molten state. Other suitable methods for fusing these components include arc melting, induction heating and direct flame. In all of these methods, fusion is effective to thoroughly disperse the nickel in the ferrophosphorus. An inert atmosphere is used during the fusion process to prevent oxidation of the components. Suitable inert gases include, by way of illustration, nitrogen, argon and helium.

Amounts of nickel of from about 5% to about 70% by total weight of the composition are suitable in the practice of this invention, although amounts of between about 10 to about 45 by weight are preferred due to the relative expense of nickel and the effectiveness of using the preferred amounts. Surprisingly, it was found that less than about 20% by weight of nickel results in a composition containing $Ni_2P$ and ferrophosphorus, with no unreacted nickel being detected. Amounts of nickel of between about 20% and 60% result in the formation of an alloy having the formula $Fe_{(3-X)}Ni_XP$, where X is between 1 and 2. This alloy has been identified in the literature as the mineral "Schriebersite".

The substitution of aluminum or zinc for nickel was attempted without success. For instance, a composition formed by fusing 10% aluminum and 90% ferrophosphorus was prepared, and although this composition was conductive and had magnetic properties, it yielded phosphine readily (even in a dry, lump form), and thus had limited practical usefulness. The fusion of zinc and ferrophosphorus was also attempted, but the results were also unsatisfactory.

Once formed, the composition is cooled and ground or atomized by subjecting it to suitable crushing or grinding operations in order to obtain particles within the desired size ranges. Pigment grade material, suitable for the preparation of coatings, typically has a particle size of 0.1 to 15 microns, and preferably 0.1 to 10 microns.

Following particle size reduction, it may be useful to wash or rinse the particles in an aqueous solution of a dilute mineral acid, such a hydrochloric acid or sulfuric acid, to remove any surface film from the particles which could diminish the conductivity.

A coating composition containing the particles of the nickel, iron and phosphorus composition of the present invention may be formulated by admixing the particles with a suitable binder using conventional mixing techniques. This coating composition can also include other conductive metals such as zinc metal, for improved corrosion protection and weldability, and nickel for EMI shielding applications. The composition of the present invention is, however, sufficiently conductive and magnetic to be used alone as the sole pigment in EMI shielding and electrostatic dissipation applications. In the latter applications, a paint containing the composition of this invention as a pigment has been found to be substantially resistant to humidity. The uses enumerated above are not exclusive, and other uses such as powder metallurgy are also contemplated herein.

More specifically, when the compositions of the present invention are incorporated into a coating formulation, the binder component of the formulation comprises 5 to 50% by weight of the non-volatile components, and preferably from 10% to 30% by weight of the non-volatile components. Various binder materials, both organic and inorganic, may be used, the choice of a particular resin binder being dependent upon the characteristics which are desired for the particular application. Typical binders include various synthetic resins, such as epoxies, chlorinated rubber, silicates, acrylics, polyurethanes, and the like. The use of these and other similar binder materials will be readily apparent to those skilled in the art.

The pigment components of the coating can be present in an amount of from about 50% to about 95% by weight of the total non-volatile coating composition, with amounts within the range of about 70% to about 90% by weight being preferred. In addition to the particles of the composition of this invention, the pigment can also include particles of other conductive metals. As mentioned previously, zinc metal particles may be used in applications such as corrosion protection for corrodible substrates. The metal particles are pigment grade typically having average sizes within the range of about 0.1 to 15 microns. The amount of zinc required in each instance to impart the desired characteristics to the coating will be readily ascertainable by those skilled in the art.

Depending upon the particular binder which is selected, the coating composition may also contain suitable solvents, curing agents, suspending agents, plasticizers and the like. The selection of the type and amounts of these other components will depend on the particular binder as well as the ultimate characteristics desired for the particular coating composition and its use.

The formulated coating composition may be applied to a suitable substrate using any available technique such as, for example, spraying, brushing, immersion, flowing, or the like. Typically, the coating composition is applied to produce a film having a thickness within the range of about 0.5 to 10 mils, although thicknesses which are outside of this range may also be used to advantage. Typical metal substrates where corrosion protection is desired include ship hulls, bridges, pipes, storage tanks, coil coat applications, and the like. Substrates where weldability is desired include many of the above. EMI shielding substrates are typically plastic materials which house electronic components such as computer consoles, instrument housings and the like. For static dissipation applications, substrates may be metal or non-metal on which a conductive coating is formed.

The following specific examples are provided as exemplary of various embodiments of the present invention, but are not intended to limit the full scope of the invention as defined by the appended claims.

EXAMPLES 1-3

A crucible was formed from a 2-inch O.D. graphite rod having a 1½ inch I.D. hole 1¾ inch deep with a conical bottom. An electric arc welder was used to fuse nickel powder and ferrophosphorus powder (Ferrophos$^R$) (approximately equivalent particle sizes) using a nitrogen surface purge, with the crucible itself forming one electrode, and a moveable graphite rod forming the other electrode. Using this procedure, 25 gram samples (total weight) were prepared using the following formulations:

| Example | Formulation |
|---|---|
| 1 | 100% Ferrophos |
| 2 | 95% Ferrophos + 5% Nickel |
| 3 | 90% Ferrophos + 10% Nickel |

The resistivities of these formulations was measured, and the results were as follows:

| Example | Resistivity |
|---|---|
| 1 | 3.9 Ohms |
| 2 | 0.3 Ohms |
| 3 | 0.08 Ohms |

The fused composition of Example 2 becomes diamagnetic at about 70° C. and the fused composition of Example 3 becomes diamagnetic at about 160° C.

Acrylic-based paint films prepared using equivalent amounts of pigments prepared by atomizing these formulations had the following conductivity characteristics:

| Example | Resistance |
|---|---|
| 1 | 115 Ohm sq./1.75 mil. |
| 2 | 23 Ohm sq./2.5 mil. |
| 3 | 16 Ohm sq./2.5 mil. |

Although the present invention has been described with respect to several illustrative embodiments, it should not be interpreted as being so limited. As will be evident to those skilled in the art, other substitutions and equivalents are possible without departing from the spirit of the invention or the scope of the claims.

What is claimed is:

1. A method of making a fused composition of nickel, iron, and phosphorus comprising
   (1) fusing at a temperature of at least about 1455° C. a mixture of
      (a) about 5 to about 70% by weight nickel; and
      (b) about 30 to about 95% by weight ferrophosphorus, where said ferrophosphorus contains about 20 to about 28% by weight phosphorus;
   (2) allowing the fused mixture to cool to form a solid mass; and
   (3) comminuting said solid mass to form particles.

2. A method according to claim 1 wherein the amount of said nickel is about 10% to about 45% by weight.

3. A method according to claim 1 wherein said solid mass is comminuted to a particle size of about 0.1 to about 15 microns.

4. The method of claim 1 wherein said nickel is added to molten ferrophosphorus in an electric furnace.

5. A method according to claim 1 wherein amount of said nickel is about 20% to about 60% by weight.

6. A method according to claim 5 wherein said composition is the alloy Schriebersite of the formula $Fe_{(3-X)}Ni_XP$, where X is between 1 and 2.

7. A coating composition having a non-volatile content comprising about 5 to about 50 percent by weight of a binder and from about 50 to about 95 percent by weight of a 8. A metal substrate coated with the composition of claim 7 as a weldable coating.

9. A substrate coated with the composition of claim 7 as a conductive coating.

10. A plastic substrate coated with the composition of claim 9 as an EMI shielding coating.

11. A composition according to claim 7 which also contains particles of zinc.

12. A metal substrate coated with the composition of claim 11 as a corrosion resistant coating.

13. A coating composition according to claim 7 wherein said particles have an average size of about 0.1 to about 15 microns.

14. A coating composition according to claim 7 wherein the amount of said nickel is 20% to about 60% by weight and the alloy Schriebersite, having the formula $Fe_{(3-X)}Ni_XP$, where X is between 1 and 2, is formed.

15. A coating composition according to claim 7 wherein the amount of said nickel is about 10% to about 45% by weight.

16. A coating comprising
   (1) about 5 to about 50% by weight resinous binder; and
   (2) about 50 to about 95% by weight pigment particles which comprise a fused composition of
      (a) about 5 to about 70% by weight nickel; and
      (b) about 30 to about 95% by weight ferrophosphorus, where said ferrophosphorus contains about 20 to about 28% by weight phosphorus.

17. A coating according to claim 16 wherein the amount of said nickel is about 20% to about 60% by weight and the alloy Schriebersite, having the formula $Fe_{(3-X)}Ni_XP$, where X is between 1 and 2, is formed.

18. A coating according to claim 16 wherein the amount of said nickel is about 10% to about 45% by weight.

* * * * *

UNITED STATES PATENT OFFICE
CERTIFICATE OF CORRECTION

PATENT NO. : 4,906,522

DATED : March 6, 1990

INVENTOR(S) : George T. Miller

It is certified that error appears in the above-identified patent and that said Letters Patent is hereby corrected as shown below:

Claim 7, line 3, after "of a" insert
---fused composition according to Claim 1---

Signed and Sealed this

Seventeenth Day of July, 1990

Attest:

*Attesting Officer*

HARRY F. MANBECK, JR.

*Commissioner of Patents and Trademarks*